3,026,339
9,11-DIHALOGENO SUBSTITUTED STEROIDS OF THE ANDROSTANE SERIES

David H. Gould, Leonia, and Cecil H. Robinson, Clifton, N.J., assignors to Schering Corporation, Bloomfield, N.J., a corporation of New Jersey
No Drawing. Filed June 1, 1959, Ser. No. 817,070
20 Claims. (Cl. 260—397.45)

This invention relates to novel and therapeutically useful halogenated steroids and to methods for their manufacture. In particular, this invention relates to $9\alpha,11\beta$-dihalogenated derivatives of androstane which exhibit valuable anabolic and androgenic properties.

Our novel compounds are androstanes represented by the following formula, and their 19-nor analogs:

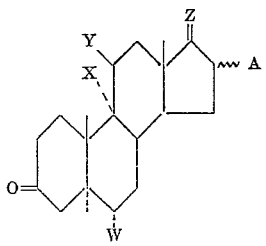

wherein W is a member of the group consisting of hydrogen, fluorine and methyl; X and Y are halogen; Z is a member of the group consisting of O, (H,$\beta$OR) and lower alkyl, ($\beta$OR) wherein R is a member of the group consisting of H and acyl; and A may be hydrogen or lower alkyl. The bond designated by a wavy ($\sim$) in the above formula indicates that the substituent at the 16-carbon may be in an $\alpha$ or $\beta$-position.

Illustrative of the 17$\beta$-acyl groups in the 17$\beta$-acyloxy derivatives contemplated by our invention are lower alkanoates such as acetate, propionate, $\beta$-cyclopentylpropionate, caproate, valerate, t-butylacetate and the like. The term lower alkanoate thus includes acid radicals of monocarboxylic aliphatic acids containing up to eight carbon atoms.

By lower alkyl we include groups having up to four carbon atoms such as methyl, ethyl, propyl, isopropyl, n-butyl and t-butyl.

Typical dihalogenated androstanes encompassed by our invention are $9\alpha,11\beta$-dichloroandrostane-3,17-dione,
$6\alpha,11\beta$-difluoro-$9\alpha$-chloroandrostane-3,17-dione,
$6\alpha$-methyl-$9\alpha$-bromo-$11\beta$-fluoroandrostane-3,17-dione,
$9\alpha$-bromo-$11\beta$-chloroandrostane-17$\beta$-ol-3-one 17$\beta$-propionate,
$6\alpha$-fluoro-$9\alpha,11\beta$-dichloro-androstane-17$\beta$-ol-3-one,
$6\alpha$-methyl-$9\alpha,11\beta$-dichloro-19-norandrostane-3,17-dione,
$9\alpha$-bromo-$11\beta$-fluoro-$16\alpha$-methylandrostane-17$\beta$-ol-3-one,
$9\alpha,11\beta$-dichloro-$16\beta$-methyl-androstane-3,17-dione,
$9\alpha$-bromo-$11\beta$-fluoro-$16\beta$-methylandrostane-17$\beta$-ol-3-one,
$9\alpha$-bromo-$11\beta$-fluoro-19-norandrostane-17$\beta$-ol-3-one,
$9\alpha,11\beta$-dichloro-$17\alpha$-methyl-androstane-17$\beta$-ol-3-one,
$9\alpha,11\beta$-dichloro-$17\alpha$-methyl-19-norandrostane-17-$\beta$-ol-3-one 17$\beta$-propionate,
$6\alpha,17\alpha$-dimethyl-$9\alpha$-bromo-$11\beta$-fluoroandrostane-17$\beta$-ol-3-one,
$9\alpha$-fluoro-$11\beta$-chloro-$17\alpha$-methylandrostane-17$\beta$-ol-3-one and the like.

Our novel compounds, while possessing both anabolic and androgenic properties, have a very high anabolic to androgenic activity ratio, and are thus therapeutically valuable for the treatment of disorders requiring high anabolic activity with a minimum of concomitant androgenic effects. Our halogenated androstanes are therefore useful in the treatment of geriatric disorders, metabolic imbalance in children, debilitating diseases, severe infections, as well as post-surgical therapy. Our compounds are advantageously used in place of anabolic/androgenic agents used in known anabolic/androgenic pharmaceutical preparations. They are preferably administered orally in the form of tablets, capsules, and the like in dosages ranging from 0.5 mg. to 20 mg. depending on the age of the patient and the severity of the illness.

All the androstanes encompassed by the above formula and their 19-nor analogs are valuable anabolic agents, the preferred species being those compounds possessing a 17$\beta$-hydroxy group (i.e. both the 17$\alpha$-hydrogen and 17$\alpha$-alkyl analogs) and particularly the $9\alpha$-bromo-$11\beta$-fluoro, $9\alpha$-bromo-$11\beta$-chloro, and the $9\alpha,11\beta$-dichloro analogs thereof.

Our $9\alpha,11\beta$-dihalogenated androstanes are generally prepared by reacting a 9(11)-androstene-3,17-dione or a 9(11)-androstene-17$\beta$-ol-3-one or a 17$\alpha$-methyl-9(11)-androstene-17$\beta$-ol-3-one and the corresponding 19-nor analogs with a suitable halogenating agent. Our starting compounds are represented by $\Delta^{9(11)}$-androstenes such as 9(11)-androstene-3,17-dione,
$6\alpha$-fluoro-9(11)-androstene-3,17-dione,
$6\alpha$-methyl-9(11)-androstene-3,17-dione,
$16\alpha$-methyl-9(11)-androstene-3,17-dione,
$16\beta$-methyl-9(11)-androstene-17$\beta$-ol-3-one,
9(11)-androstene-17$\beta$-ol-3-one,
$6\alpha$-fluoro-9(11)-androstene-17$\beta$-ol-3-one,
$6\alpha$-methyl-9(11)-androstene-17$\beta$-ol-3-one,
$17\alpha$-methyl-9(11)-androstene-17$\beta$-ol-3-one,
$6\alpha,17\alpha$-dimethyl-9(11)-androstene-17$\beta$-ol-3-one,
$6\alpha$-fluoro-$17\alpha$-methyl-9(11)-androstene-17$\beta$-ol-3-one including the 19-nor analogs of the foregoing as well as the 17$\beta$-acylates of the compounds containing a 17-hydroxyl group.

The starting materials thus necessarily possess a $\Delta^{9(11)}$-bond; and in the case of 9(11)-androstene-3,17-dione, its preparation is described in the literature. The other aforementioned starting substances are prepared by a combination of processes analogous to known procedures. For example, $6\alpha$-methyl-9(11)-androstene-3,17-dione is prepared from $6\alpha$-methyl-4,9(11)-androstadiene-3,17-dione by selectively reducing the $\Delta^4$-bond by means of reagents such as lithium in liquid ammonia and catalytic hydrogenation with noble metal catalysts such as palladium, platinum and the like. Other 9(11)-androstenes which are similarly prepared from their $\Delta^4$-analogs includes compounds such as 9(11)-androstene-17$\beta$-ol-3-one,
$6\alpha$-methyl-9(11)-androstene-17$\beta$-ol-3-one,
19-nor-9(11)-androstene-17$\beta$-ol-3-one,
$6\alpha$-methyl-19-nor-9(11)-androstene-17$\beta$-ol-3-one,
$6\alpha$-fluoro-$17\alpha$-methyl-19-nor-9(11)-androstene-17$\beta$-ol-3-one,
$6\alpha,17\alpha$-dimethyl-19-nor-9(11)-androstene-17$\beta$-ol-3-one and
$6\alpha$-fluoro-$17\alpha$-methyl-19-nor-9(11)-androstene-17$\beta$-ol-3-one.

A 9(11)-dehydro-androstane intermediate may also be prepared from a $\Delta^4$-11$\beta$-hydroxyandrostane such as $6\alpha$-fluoro-4-androstene-11$\beta$-ol-3,17-dione by dehydration of the 11$\beta$-hydroxy group as effected by reagents such as methanesulfonyl chloride in the presence of pyridine or phosphorus oxychloride in pyridine to form the $\Delta^{4,9(11)}$-androstadiene, i.e. $6\alpha$-fluoro-4,9(11)-androstadiene-3,17-dione, with subsequent selective hydrogenation at C-4 and C-5 by the aforementioned techniques to yield the requisite starting compound, exemplified by 6α-fluoro-9(11)-androstene-3,17-dione. By following a similar sequence of reactions, 19-nor-9(11)-androstene-3,17-dione and 6α-fluoro-19-nor-9(11)-androstene-3,17-dione are prepared from their corresponding Δ⁴-11β-hydroxy derivatives.

An 11α-hydroxy compound such as 17α-methyl-19-nor-4-androstene-11α,17β-diol-3-one is also convertible to a 9(11)-dehydro starting compound such as 17α-methyl-19-nor-9(11)-androstene-17β-ol-3-one through an 11α-sulfonate ester such as the 11α-p-toluenesulfonate which is prepared by known esterification techniques and which is subsequently dehydrated by, for example, an ethanolic solution of sodium formate, followed by the selective reduction of the Δ⁴-bond by procedures described heretofore.

A starting compound containing a secondary hydroxyl group at C–17 such as 9(11)-androstene-17β-ol-3-one is conveniently converted to the corresponding 17β-ester by known techniques such as that utilizing an acid anhydride in pyridine, for example, propionic anhydride in pyridine, to yield 9(11)-androstene-17β-ol-3-one 17β-propionate and 17α - methyl - 9(11) - androstene-17β-ol-3-one 17β-propionate. With androstanes containing a tertiary hydroxyl group at C–17, for example, 17α-methyl-19-nor-9(11)-androstene-17β-ol-3-one, the 17-ester (i.e. 17α-methyl-19-nor-9(11)-androstene - 17β - ol-3-one-17β-propionate) is obtained by heating together a mixture of the hydroxylated androstane and an acid anhydride such as propionic anhydride preferably without a solvent, although inert solvents such as toluene or benzene may be employed. By substituting other acid anhydrides such as acetic or cyclopentylpropionic anhydride for propionic anhydride in the above procedures the corresponding 17β-acylates are obtained. Typical starting esters prepared as described above are 6α-fluoro-9(11)-androstene-17β-ol-3-one 17β-propionate, 6α-methyl-9(11)-androstene-17β-ol-3-one 17β-propionate, 19-nor-9(11)-androstene-17β-ol-3-one 17β-propionate, 6α-fluoro-19-nor-9(11)-androstene-17β-ol-3-one 17β-propionate, 6α-methyl - 19 - nor-9(11)-androstene-17β-ol-3-one 17β-acetate, 17α-methyl-19-nor-9(11)-androstene-17β - ol - 3 - one 17β-propionate, 6α-fluoro-17α-methyl-19-nor - 9(11) - androstene-17β-ol-3-one 17β-propionate, and 6α,17α-dimethyl-9(11)-androstene-17β-ol-3-one 17β-propionate.

The above-mentioned esterification procedures are also useful in converting 9α,11β-dihalogeno-17β-hydroxy androstanes of our invention to their corresponding 17-esters. For example, 9α-chloro-11β-fluoroandrostane-17β-ol-3-one when reacted with propionic acid in pyridine is converted to 9α-chloro-11β-fluoroandrostane-17β-ol-3-one 17β-propionate.

Alternatively, a 9(11)-dehydro intermediate compound such as 4,9(11)-androstadiene-17β-ol-3-one 17β-propionate or a 9α,11β-dihalogenated androstane such as 6α,11β-difluoro - 9α - bromoandrostane-17β-ol-3-one 17β-propionate containing a 17β-acyloxy group are hydrolyzed to their respective 17-hydroxyl groups by means of reagents such as methanolic aqueous sodium hydroxide or when hydrolyzing the halogenated compounds with 0.27 normal methanolic perchloric acid.

A 17-keto-9(11)-dehydro intermediate such as 6α-fluoro-19-nor-4,9(11)-androstadiene-3,17-dione is convertible to the 17-hydroxylated starting compound, 6α-fluoro-19-nor-9(11)-androstene-3-one by conversion of the 17-ketone group to the 17-hydroxyl group by employing microbiological techniques utilizing bakers yeast according to well known procedures, followed by the selective reduction of the Δ⁴-bond in the 6α-fluoro-19-nor-4,9(11)-androstadiene-17β-ol-3-one thereby produced.

A 17-keto compound is convertible to the corresponding 17β-hydroxy-17α-methyl intermediate by reacting a 3,17-diketo starting compound such as 6α-methyl-19-nor-4,9(11)-androstadiene-3,17-dione in which the 3-ketone group is protected by a group such as the 3-pyrrolidylenamine, with a Grignard reagent such as methyl magnesium bromide by known methods to give 6α,17α-dimethyl-19-nor-4,9(11)-androstadiene-17β-ol-3-one, and then selectively reducing the Δ⁴-bond to yield 6α,17α-dimethyl-9(11)-androstene-17β-ol-3-one.

To obtain a 6-substituted-9(11)-androstene from an androstane such as 19-nor-4-androstene-11β-ol-3,17-dione, known chemical techniques are employed. Typically, 19-nor-4-androstene-11β-ol-3,17-dione is treated with ethylene glycol by known procedures to form the 3,17-bis-ethylene ketal derivative which, in turn is epoxidized to give 5α,6α-epoxy-19-norandrostane-17β-ol-3,17-acid to give 5α,6α-epoxy-19-norandrostane-11β-ol-3,17-dione 3,20-bis-ethylene ketal. From this epoxy intermediate both the 6-methyl and 6-fluoro substituents are introduced into the androstane nucleus. Thus, the action of hydrofluoric acid on the epoxy bis-ethylene ketal intermediate simultaneously hydrolyzes the bis-ethylene ketal groups and opens the epoxy ring to yield 6β-fluoro-19-norandrostane-5α,11β-diol-3,17-dione, whereas addition of a Grignard reagent such as methyl magnesium iodide with subsequent hydrolysis yields 6β-methyl-19-norandrostane-5α,11β-diol-3,17-dione. A reagent such as ethanolic hydrochloric acid on these 5α-hydroxy-6β-substituted androstanes simultaneously dehydrates the hydroxy group and epimerizes the 6β-substituent to yield, respectively, 6α - fluoro - 19-nor-4,9(11) - androstadiene-17β-ol-3-one and 6α - methyl - 19 - nor - 4,9(11) - androstadiene-17β-ol-3-one which upon selective reduction of the Δ⁴-bond with, for example, lithium in liquid ammonia there are produced the necessary 9(11)-dehydro starting compounds, 6α-fluoro-19-nor-9(11)-androstene-17β-ol-3-one and 6α - methyl - 19-nor - 9(11)-androstene-17β-ol-3-one, respectively.

The 16-alkyl-9(11)-androstene starting compounds are conveniently obtained from 16 - alkyl - 4,9(11) - pregnadiene-intermediates (which are prepared according to procedures described in copending application Serial No. 733,843 of Rausser et al., filed May 8, 1958) by the oxidative degradation of the C–17 side chain to form a 17-keto-4,9(11)-androstadiene followed by selective reduction of the Δ⁴-bond by techniques described above. For example, 16α - methyl - 4,9(11)-pregnadiene-17α,21-diol-3,20-dione when oxidized with sodium bismuthate by known procedures is converted to 16α-methyl-4,9(11)-androstadiene-3,17-dione which, when selectively reduced with lithium in liquid ammonia, yields the requisite intermediate, 16α-methyl-9(11)-androstene-3,17-dione. The 16-alkyl-17-keto-9(11)-dehydroandrostanes thus prepared are conveniently converted to the corresponding 17β-hydroxy and 17β-hydroxy-17α-lower alkyl analogs according to procedures described heretofore.

As stated heretofore, our 9α,11β-dihalogeno-androstanes are generally prepared from the above-mentioned 9(11)-androstene intermediates by utilizing halogenating agents under reaction conditions described in Patent No. 2,894,963 and in the copending application, Serial No. 817,048 of Gould et al., filed on June 1, 1959, and of Serial No. 817,079 of Robinson, filed June 1, 1959 Intermediates, other than the 9(11)-dehydroandrostanes are also advantageously used to prepare our halogenated androstanes by employing techniques as outlined in the copending application Serial No. 817,048 of Gould et al., filed June 1, 1959. For example, 9α-fluoro-17α-methyl-4-androstene-17β-ol-3,11-dione is convertible to 9α-fluoro - 11β - chloro-17α-methylandrostane-17β-ol-3-one, a novel compound of our invention, through a sequence of reactions wherein the Δ⁴-11-keto starting compound is reduced with lithium in liquid ammonia, for example, to form the intermediate 9α-fluoro-17α-methylandrostane-11α,17β-diol-3-one which is esterified in pyridine with a sulfonic acid chloride such as methyl sulfonyl chloride to form 9α-fluoro-17α-methylandrostane-11α,17β-diol-3-one 11α-methylsulfonate. Replacement of the sulfonated ester with chlorine is effected by means of a reagent mixture such as lithium chloride in dimethylsulfoxide to give 9α-fluoro-11β-chloro - 17α - methylandrostane - 17β - ol-3-one.

The following examples are illustrative of the procedures employed in preparing the compounds of this invention but are not to be construed as limiting the scope thereof; the scope of our invention being limited only by the appended claims.

EXAMPLE 1

9α,11β-Dichloroandrostane-3,17-Dione

To a stirred solution of 1 g. of 9(11)-androstene-3,17-dione in 40 ml. of carbon tetrachloride and 0.8 ml. of pyridine is added at −20° C. a solution of 275 mg. of chlorine in 3 ml. of carbon tetrachloride. The reaction mixture is stirred at −20° C. for 15 minutes and then allowed to warm to room temperature during a further 15 minute interval. About 15 ml. of methylene chloride is then added and the resulting solution is washed successively with sodium thiosulfate solution, water, 10% aqueous sodium bicarbonate solution and finally with water, then is dried over magnesium sulfate and evaporated in vacuo to a residue which is crystallized from acetone-hexane to give 9α,11β-dichloroandrostane-3,17-dione.

EXAMPLE 2

6α,11β-Difluoro-9α-Chloroandrostane-3,17-Dione

A. *6α - fluoro-4,9(11)-androstadiene-3,17-dione.*—To a stirred solution of 2 g. of 6α-fluoro-4-androstene-11β-ol-3,17-dione in 20 ml. of dimethylformamide and 2 ml. of pyridine, cooled to 0° C., is added 1.50 g. of methanesulfonyl chloride. The reaction mixture is stirred at room temperature for 24 hours, then diluted with water and extracted with methylene chloride. The methylene chloride extracts are combined, washed with 10% aqueous sodium bicarbonate solution, then with water and is dried over magnesium sulfate, filtered and evaporated in vacuo to a residue which is dissolved in methylene chloride and chromatographed on a column of Florisil. The fractions eluted with 60–75% ether-in-hexane are combined and concentrated in vacuo to give 6α-fluoro-4,9(11)-androstadiene-3,17-dione.

B. *6α-fluoro-9(11)-androstene-3,17-dione.*—A solution of 2 g. of 6α-fluoro-4,9(11)-androstadiene-3,17-dione (the compound of Example 2A) in 70 ml. of dry tetrahydrofuran is added rapidly with vigorous stirring to a solution of 600 mg. of lithium in 400 ml. of liquid ammonia. Any excess lithium (as evidenced by a blue solution color) is immediately destroyed by adding solid ammonium chloride until the blue color is discharged. The ammonia and tetrahydrofuran are allowed to evaporate at room temperature, water is added to the resultant residue and the mixture is extracted with ether. The ethereal solution is washed with water, dried over magnesium sulfate, filtered and evaporated in vacuo to yield a crude product substantially of 6α-fluoro-9(11)-androstene-17β-ol-3-one. This material is immediately dissolved in 30 ml. of acetone, cooled to −10° C., and there is added dropwise a chromium trioxide-sulfuric reagent (prepared as described by Curtis et al., J. Chem. Soc., 461 (1953)) until a prominent orange color develops. The reaction mixture is then diluted with water and filtered. The solid precipitate is washed with water, dried and crystallized from acetone-hexane to give 6α-fluoro-9(11)-androstene-3,17-dione.

C. *6α,11β - difluoro-9α-chloroandrostane-3,17-dione.*—To a stirred solution of 1 g. of 6α-fluoro-9(11)-androstene-3,17-dione (the compound of Example 2B) in 30 ml of carbon tetrachloride and 5.4 ml. of pyridine, cooled to −25° C., is added a solution of 730 mg. of hydrogen fluoride in 2.3 ml. of dimethylformamide followed by 480 mg. of N-chlorosuccinimide. The reaction mixture is stirred at −25° C. for 15 minutes and then at room temperature for 20 hours. The reaction mixture is then diluted with 100 ml. of methylene chloride and poured into 200 ml. of 10% aqueous sodium bicarbonate solution with vigorous stirring. The solvent layers are separated and the organic phase is washed with 10% aqueous sodium bicarbonate solution, then with water, is dried over magnesium sulfate and filtered. The methylene chloride solution is distilled in vacuo to a residue which is crystallized from acetone-hexane to give 6α,11β-difluoro-9α-chloroandrostane-3,17-dione.

EXAMPLE 3

6α-Methyl-9α-Bromo-11β-Fluoroandrostane-3,17-Dione

A. *6α-methyl-9(11) - androstene - 3,17 - dione.*—Two grams of 6α-methyl-4,9(11)-androstadiene-3,17-dione are dissolved in 80 ml. of tetrahydrofuran and reduced with a solution of 600 mg. of lithium in 450 ml. of liquid ammonia in the manner of Example 2B. The resultant product is isolated and purified in the described manner to give 6α-methyl-9(11)-androstene-3,17-dione.

B. *6α-methyl - 9α - bromo-11β-fluoroandrostane-3,17-dione.*—To a stirred solution of 1 g. of 6α-methyl-9(11)-androstene-3,17-dione (the compound of Example 3A) in 50 ml. of diethylacetic acid contained in a polyethylene bottle there is added at room temperature a solution of 1.27 g. of hydrogen fluoride in 5 ml. of chloroform-tetrahydrofuran solution 1:2), followed by 502 mg. of N-bromoacetamide. The solution is stirred at room temperature for 17 hours and is then poured into 500 ml. of 10% aqueous sodium bicarbonate solution. The mixture is extracted with methylene chloride and the extracts washed with water, dried over magnesium sulfate, filtered and evaporated in vacuo to a residue which is crystallized from ether-hexane to give 6α-methyl-9α-bromo-11β-fluoroandrostane-3,17-dione.

EXAMPLE 4

9α-Chloro-11β-Fluoroandrostane 17β-ol-3-one

A. *9(11)-androstene-17β-ol-3-one.*—One gram of 4,9(11)-androstadiene-17β-ol-3-one is dissolved in 25 ml. of tetrahydrofuran and added rapidly with vigorous stirring to a solution of 300 mg. of lithium in 175 ml. of liquid ammonia. Any excess lithium is destroyed immediately by adding solid ammonium chloride until the blue color is discharged and the mixture is then allowed to evaporate at room temperature. Water is added to the resultant residue and the mixture extracted with methylene chloride. The organic extracts are combined, washed with water and evaporated in vacuo to a residue which is crystallized from acetone-hexane to give 9(11)-androstene-17β-ol-3-one.

B. *9α-chloro-11β - fluoroandrostane-17β-ol-3-one.*—500 mg. of 9(11)-androstene-17β-ol-3-one (the compound of Example 4A) is allowed to react with 257 mg. of N-chlorosuccinimide and 350 mg. of hydrogen fluoride in the manner of Example 2C. The resultant product is isolated and purified in the described manner to give 9α-chloro-11β-fluoroandrostane-17β-ol-3-one.

EXAMPLE 5

9α-Chloro-11β-Fluoroandrostane-17β-ol-3-one 17β-Propionate

A. *9(11)-androstene-17β-ol-3-one 17β-propionate.*—To a solution of 1 g. of 9(11)-androstene-17β-ol-3-one (the compound of Example 4A) in 20 ml. of pyridine there is added at room temperature 5 ml. of propionic anhydride and the mixture is allowed to stand at room temperature for 17 hours. Crushed ice is added and the reaction mixture allowed to slowly attain room temperature. A solid separates which is filtered, washed with water, dried at room temperature and crystallized from acetone-hexane to give 9(11)-androstene-17β-ol-3-one 17β-propionate.

Similarly, by substituting other acid anhydrides such as acetic anhydride or cyclopentylpropionic anhydride for propionic anhydride in the above procedure, the corresponding 17-acetate and 17β-cyclopentylpropionate respectively of 9(11)-androstene-17β-ol-3-one will be obtained.

B. *9α - chloro-11β-fluoroandrostane-17β-ol-3-one 17β-propionate.*—9(11) - androstene - 17β-ol - 3 - one 17β-propionate (the compound of Example 5A) is allowed to react with 432 mg. of N-chlorosuccinimide and 590 mg. of hydrogen fluoride in the manner of Example 2B. The resultant product is isolated and purified in the described manner to give 9α-chloro-11β-fluoroandrostane-17β-ol-3-one 17β-propionate.

Alternatively, the compound of this example is prepared from 9α-chloro-11β-fluoroandrostane-17β-ol-3-one (the compound of Example 4B) by reacting it with propionic anhydride and pyridine in the manner described in Example 5A to give 9α-chloro-11β-fluoroandrostane-17β-ol-3-one 17β-propionate.

Similarly, other 17β-acylates of the compound of this example may be obtained by substituting anhydrides as acetic anhydride and β-cyclopentylpropionic anhydride for propionic anhydride in the above procedure to yield respectively the 17-acetate and 17-(β-cyclopentylpropionate) of 9α-chloro-11β-fluoro-17β-ol-3-one.

EXAMPLE 6

*9α - Bromo - 11β - Chloroandrostane - 17β-ol-3-one 17β-Propionate*

To a stirred solution of 1 g. of 9(11)-androstene-17β-ol-3-one 17β-propionate (the compound of Example 5A) and 5 g. of lithium chloride in 40 ml. of glacial acetic acid is added 440 mg. of N-bromoacetamide and a solution of 116 mg. of hydrogen chloride in 1.2 ml. of tetrahydrofuran. The reaction mixture is stirred at room temperature for 3 hours, then is poured into water. A solid separates which is filtered, washed with water, dried and crystallized from methylene chloride-pentane to give 9α - bromo-11β-chloroandrostane-17β-ol-3-one 17β - propionate.

EXAMPLE 7

*6α-Fluoro-9α,11β-Dichloroandrostane-17β-ol-3-one*

A. *6α-fluoro-4,9(11)-androstadiene-17β-ol-3-one 17β-propionate.*—Two grams of 6α-fluoro-4-androstene-11β,17β-diol-3-one 17β-propionate are dissolved in 20 ml. of dimethylformamide and 2 ml. of pyridine and allowed to react with 1.6 g. of methanesulfonyl chloride in the manner of Example 2A. The resultant product is isolated in the described manner and crystallized from acetone-pentane to give 6α-fluoro-4,9(11)-androstadiene-17β-ol-3-one 17β-propionate.

B. *6α-fluoro-4,9(11)-androstadiene-17β-ol-3-one.*—To a solution of 1 g. of 6α-fluoro-4,9(11)-androstadiene-17β-ol-3-one 17β-propionate (the compound of Example 7A) in 50 ml. of methanol is added 8.2 ml. of 0.5 N aqueous sodium hydroxide. The mixture is allowed to stand at room temperature for 48 hours, then is neutralized with acetic acid and evaporated in vacuo to a residue which is crystallized from methylene chloride-hexane to give 6α-fluoro-4,9(11)-androstadiene-17β-ol-3-one.

C. *6α-fluoro-9(11)-androstene-17β-ol-3-one.*—A solution of 2 g. of 6α-fluoro-4,9(11)-androstadiene-17β-ol-3-one (the compound of Example 7B) in 70 ml. of tetrahydrofuran is reduced with a solution of 600 mg. of lithium in 400 mg. of liquid ammonia in the manner of Example 4A. The resultant product is isolated and purified in the described manner to give 6α-fluoro-9(11)-androstene-17β-ol-3-one.

D. *6α-fluoro-9α,11β-dichloroandrostane-17β-ol-3-one.*—In the manner described in Example 1, one gram of 6α-fluoro-9(11)-androstene-17β-ol-3-one (the compound of Example 7C) in 40 ml. of carbon tetrachloride and 0.8 ml. of pyridine is allowed to react with 256 mg. of chlorine and the resultant product isolated and purified to give 6α-fluoro-9α,11β-dichloroandrostane-17β-ol-3-one.

EXAMPLE 8

*6α - Fluoro-9α,11β-Dichloroandrostane-17β-ol-3-one 17β-Propionate*

A. *6α-fluoro-9(11)-androstene-17β-ol-3-one 17β - propionate.*—6α - fluoro-9(11)-androstene-17β-ol-3-one (the compound of Example 7C) is allowed to react with propionic anhydride and pyridine in the manner of Example 5A. The resultant product is isolated and purified in the described manner to give 6α-fluoro-9(11)-androstene-17β-ol-3-one 17β-propionate.

B. *6α - fluoro-9α,11β-dichloroandrostane-17β-ol-3-one 17β - propionate.*—One gram of 6α - fluoro-9(11)-androstene-17β-ol-3-one 17β-propionate (the compound of Example 8A) is allowed to react with 220 mg. of chlorine in carbon tetrachloride and pyridine in the manner of Example 1. The resultant product is isolated and purified in the described manner to give 6α-fluoro-9α,11β-dichloroandrostane-17β-ol-3-one 17β-propionate.

Alternatively, the compound of this example is prepared by reacting 6α-fluoro-9α,11β-dichloroandrostane-17β-ol-3-one (the compound of Example 7D) with propionic anhydride and pyridine in the manner described in Example 5A to give 6α-fluoro-9α,11β-dichloroandrostane-17β-ol-3-one 17β-propionate.

By substituting other lower alkanoic acid anhydrides such as acetic anhydride and valeric anhydride for propionic anhydride in the above procedure, the corresponding 17-lower alkanoates are obtained, i.e. the 17-acetate and 17-valerate respectively of 6α-fluoro-9α,11β-dichloroandrostane-17β-ol-3-one.

EXAMPLE 9

*6α-Methyl-9α,11β-Dichloroandrostane-17β-ol-3-one*

A. *6α-methyl-9(11)-androstene-17β-ol-3-one.*—A solution of 2 g. of 6α-methyl-4,9(11)-androstadiene-17β-ol-3-one in 70 ml. of tetrahydrofuran is reduced with a solution of 600 mg. of lithium in 400 ml. of liquid ammonia in the manner described in Example 4A. The resultant product is isolated and purified in the described manner to give 6α-methyl-9(11)-androstene-17β-ol-3-one.

B. *6α - methyl - 9α,11β - dichloroandrostane - 17β-ol-3-one.*—To a stirred solution of 1 g. of 6α-methyl-9(11)-androstene-17β-ol-3-one (the compound of Example 9A) in 50 ml. of carbon tetrachloride and 0.8 ml. of pyridine at —20° C. is added 490 mg. of N-chlorosuccinimide and a solution of 140 mg. of hydrogen chloride in 1.4 ml. of tetrahydrofuran. Stirring is continued at —20° C. for 15 minutes and the reaction mixture is then allowed to attain room temperature during a further 15 minute interval. 50 ml. of methylene chloride is added and the solution washed successively with aqueous sodium thiosulfate solution, water, 10% aqueous sodium bicarbonate solution and finally with water. The solution is dried over magnesium sulfate, filtered and evaporated in vacuo to a residue which is crystallized from methylene chloride-hexane to give 6α-methyl-9α,11β-dichloroandrostane-17β-ol-3-one.

EXAMPLE 10

*6α-Methyl-9α,11β-Dichloroandrostane-17β-ol-3-one 17β-Propionate*

A. *6α-methyl-9(11)-androstene-17β-ol-3-one 17β - propionate.*—6α-methyl-9(11)-androstene-17β-ol-3-one (the compound of Example 9A) is allowed to react with propionic anhydride and pyridine in the manner of Example 5A. The resultant product is isolated and purified in the described manner to give 6α-methyl-9(11)-androstene-17β-ol-3-one 17β-propionate.

B. *6α-methyl-9α,11β-dichloroandrostane - 17β-ol-3-one 17β-propionate.*—One gram of 6α-methyl-9(11)-androstene-17β-ol-3-one 17β-propionate is allowed to react with 218 mg. of chlorine in carbon tetrahcloride and pyridine in the manner described in Example 1. The resultant product is isolated and purified in the described manner to give 6α-methyl-9α,11β-dichloroandrostane-17β-ol-3-one-17β-propionate.

Alternatively, 6α-methyl - 9α,11β - dichloroandrostane-17β-ol-3-one (the compound of Example 9) is allowed to react with propionic anhydride and pyridine in the manner of Example 5A to give 6α-methyl-9α,11β-dichloroandrostane-17β-ol-3-one 17β-propionate.

EXAMPLE 11

6α-Methyl-9α-Iodo-11β-Fluoroandrostane-17β-ol-3-one 17β-Propionate

One gram of 6α-methyl-9(11)-androstene-17β-ol-3-one 17β-propionate (the compound of Example 10A) dissolved in 50 ml. of diethylacetic acid is placed in a polyethylene bottle at room temperature and there is added a solution of 1.06 g. of hydrogen fluoride in 5 ml. of chloroform-tetrahydrofuran (1:2) followed by 690 mg. of N-iodosuccinimide. The solution is stirred at room temperature for 17 hours, then poured into 500 ml. of 10% aqueous sodium bicarbonate solution. The reaction mixture is extracted with methylene chloride and the combined extracts are washed with dilute sodium thiosulfate solution and water, then is dried over magnesium sulfate. The methylene chloride solution is distilled in vacuo leaving a residue substantially of 6α-methyl-9α-iodo-11β-fluoroandrostane-17β-ol-3-one 17β-propionate.

EXAMPLE 12

9α,11β-Dibromoandrostane-17β-ol-3-one 17β-Propionate

As analogously described hereinabove, to a stirred solution of 9(11)-androstene-17β-ol-3-one 17β-propionate (the compound of Example 5A) in glacial acetic acid is added potassium bromide followed by N-bromoacetamide. The reaction mixture is stirred for 2 hours at room temperature, then poured into water. A solid separates which is filtered and dissolved in methylene chloride. The solution is dried over magnesium sulfate, filtered and concentrated in vacuo at room temperature. Hexane is added and the solution concentrated in vacuo at room temperature until crystallization occurs. The mixture is filtered yielding a solid residue substantially of 9α,11β-dibromoandrostane-17β-ol-3-one 17β-propionate.

EXAMPLE 13

9α,11β-Dichloro-19-Norandrostane-3,17-Dione

A. *19-nor-4,9(11)-androstadiene - 3,17 - dione.*—Two grams of 19-nor-4-androstene-11β-ol-3,17-dione in 20 ml. of dimethylformamide and 2 ml. of pyridine is allowed to react with 1.60 g. of methanesulfonyl chloride at 0° C. in the manner of Example 2A. The resultant product is isolated and purified in the described manner to give 19-nor-4,9(11)-androstadiene-3,17-dione.

B. *19-nor-9(11)-androstene-3,17-dione.*—According to procedures described in Example 2B, 2 g. of 19-nor-4,9(11)-androstadiene-3,17-dione (the compound of Example 13A) in 80 ml. of dry tetrahydrofuran is first reacted with 600 mg. of lithium dissolved in 400 ml. of liquid ammonia to yield a product substantially of 19-nor-9(11)-androstene-17β-ol-3-one which is further reacted with a chromium trioxide-sulfuric acid reagent. The resultant product is isolated and purified in the described manner to give 19-nor-9(11)-androstene-3,17-dione.

C. *9α,11β-dichloro - 19 - norandrostane - 3,17-dione.*—One gram of 19-nor-9(11)-androstene-3,17-dione (the compound of Example 13B) and 40 ml. of carbon tetrachloride and 0.8 ml. of pyridine is allowed to react with 540 mg. of N-chlorosuccinimide and 147 mg. of hydrogen chloride in the manner of Example 9B. The resultant product is isolated and purified in the described manner to give 9α,11β-dichloro-19-norandrostane-3,17-dione.

EXAMPLE 14

6α-Fluoro-9α,11β-Dichloro-19-Norandrostane-3,17-Dione

A. *6α - fluoro - 19-nor - 4,9(11) - androstadiene - 3,17-dione.*—Two grams of 6α-fluoro-19-nor-4-androstene-11β-ol-3,17-dione dissolved in 20 ml. of dimethylformamide and 2 ml. of pyridine are allowed to react with 1.60 g. of methanesulfonyl chloride in the manner of Example 2A. The resultant product is isolated and purified in the described manner to give 6α-fluoro-19-nor-4,9(11)-androstadiene-3,17-dione.

B. *6α-fluoro-19-nor-9(11) - androstene - 3,17-dione.*—One gram of 6α-fluoro-19-nor-4,9(11)-androstadiene-3,17-dione (the compound of Example 14A) is dissolved in 25 ml. of tetrahydrofuran and reduced with a solution of 300 mg. of lithium in 200 ml. of liquid ammonia in the manner described in Example 2B. The resultant product is isolated and purified in the described manner to give 6α-fluoro-19-nor-9(11)-androstene-3,17-dione.

C. *6α-fluoro-9α,11β-dichloro - 19 - norandrostane-3,17-dione.*—One gram of 6α-fluoro-19-nor-9(11)-androstene-3,17-dione dissolved in 35 ml. of carbon tetrachloride and 0.6 ml. of pyridine is allowed to react with 269 mg. of chlorine and the resultant product isolated and purified in the manner described in Example 1 to give 6α-fluoro-9α,11β-dichloro-19-norandrostane-3,17-dione.

EXAMPLE 15

6α-Methyl-9α,11β-Dichloro-19-Norandrostane-3,17-Dione

A. *6β - methyl - 19 - norandrostane - 5α,11β-diol-3,17-dione 3,17-bis-ethylene ketal.*—A solution of 4 g. of 5α,6α-epoxy-19-norandrostane - 11β-ol - 3,17-dione 3,17-bis-ethylene ketal in 200 ml. of tetrahydrofuran is added to 50 ml. of a stirred solution of 4 molar methyl magnesium bromide in ether under an atmosphere of nitrogen. The reaction mixture is distilled until the vapor temperature reaches 60° C., then is refluxed for 20 hours. The mixture is then cooled to room temperature, 200 ml. of benzene added and the mixture cooled further in an ice-bath. 100 ml. of water is added dropwise and the liquid phase separated. The organic layer is washed twice with 100 ml. portions of benzene and the combined extracts are washed with water, 10% ammonium chloride solution and again with water, is dried over magnesium sulfate and evaporated in vacuo to a residue which is crystallized from acetone-hexane to give 6β-methyl-19-norandrostane-5α,11β-diol-3,17-dione 3,17-bis-ethylene ketal.

B. *6β - methyl - 19 - norandrostane-5α,11β-diol-3,17-dione.*—2.5 grams of the 6β-methylandrostane prepared in Example 15A are dissolved in 60 ml. of glacial acetic acid and 20 ml. of water and heated on a steam bath for 45 minutes. The reaction mixture is then poured into ice-water and sodium bicarbonate (45 g.) is added dropwise with stirring. A solid separates which is filtered, washed with water and dried to give 6β-methyl-19-norandrostane-5α,11β-diol-3,17-dione.

C. *6α-methyl-19-nor-4-androstene-11β-ol-3,17-dione.*—6β - methyl-19-norandrostane-5α,11β-diol-3,17-dione (the compound of Example 15B) is dissolved in 200 ml. of methanol and 40 ml. of 0.1 N aqueous sodium hydroxide. The solution is refluxed for one hour, then cooled, neutralized with acetic acid and evaporated in vacuo until crystallization begins. The mixture is then chilled, filtered and the residue washed with water and dried to give 6α-methyl-19-nor-4-androstene-11β-ol-3,17-dione.

D. *6α - methyl - 19-nor-4,9(11)-androstadiene-3,17-dione.*—One gram of 6α-methyl-19-nor-4-androstene-11β-ol-3,17-dione (the compound of Example 15C) in 10 ml. of dimethylformamide and 1 ml. of pyridine is allowed to react with 800 mg. of methane sulfonyl chloride in the manner of Example 2A to give 6α-methyl-19-nor-4,9(11)-androstadiene-3,17-dione.

E. *6α - methyl - 19-nor-9(11)-androstene-3,17-dione.*—

Two grams of the 6α-methyl-19-norandrostane of Example 15D in 70 ml. of tetrahydrofuran is reduced with a solution of 600 mg. of lithium in 350 ml. of liquid ammonia and the resultant product isolated and purified in the manner described in Example 2B to give 6α-methyl-19-nor-9(11)-androstene-3,17-dione.

F. *6α - methyl - 9α,11β-dichloro-19-norandrostane-3,17-dione.*—One gram of 6α-methyl-19-nor-9(11)-androstene-3,17-dione dissolved in 30 ml. of carbon tetrachloride and 0.6 ml. of pyridine is allowed to react with 294 mg. of chlorine in the manner described in Example 1 to give 6α-methyl-9α,11β-dichloro-19-norandrostane-3,17-dione.

EXAMPLE 16

*9α-Bromo-11β-Fluoro-19-Norandrostane-17β-ol-3-one*

A. *19-nor-9(11)-androstene-17β-ol-3-one.*—One gram of 19-nor-4,9(11)-androstadiene-17β-ol-3-one dissolved in 30 ml. of tetrahydrofuran is reduced by means of a solution of 300 mg. of lithium in 200 ml. of liquid ammonia in the manner of Example 2B. The resultant product is isolated and purified in the described manner to give 19-nor-9(11)-androstene-17β-ol-3-one.

B. *9α - bromo - 11β - fluoro-19-norandrostane-17β-ol-3-one.*—One gram of 19-nor-9(11)-androstene-17β-ol-3-one (the compound of Example 16A) dissolved in 50 ml. of diethylacetic acid is allowed to react with 550 mg. of N-bromoacetamide and 1.4 g. of hydrogen fluoride in the manner of Example 3. The resultant product is isolated and purified in the described manner to give 9α-bromo-11β-fluoro-19-norandrostane-17β-ol-3-one.

EXAMPLE 17

*9α-Bromo-11β-Fluoro-19-Norandrostane-17β-ol-3-one 17β-Propionate*

A. *19-nor-9(11)-androstene-17β-ol-3-one 17β-propionate.*—19 - nor - 9(11)-androstene-17β-ol-3-one (the compound of Example 16A) is allowed to react with propionic anhydride and pyridine and the resultant product isolated and purified in the manner described in Example 5A to give 19-nor-9(11)-androstene-17β-ol-3-one 17β-propionate.

B. *9α - bromo - 11β - fluoro-19-norandrostane-17β-ol-3-17β-propionate.*—One gram of 19-nor-9(11)-androstene-17β-ol-3-one 17β-propionate (prepared as in Example 17A) is allowed to react with 459 mg. of N-bromoacetamide and 1.16 g. of hydrogen fluoride according to the procedure of Example 3. The resultant product is isolated and purified in the described manner to give 9α-bromo-11β-fluoro-19-norandrostane-17β-ol-3-one 17β-propionate.

Alternatively, 9α - bromo-11β-fluoro-19-norandrostane-17β-ol-3-one (the compound of Example 16) is reacted with propionic anhydride and pyridine according to the procedure of Example 5A to give 9α-bromo-11β-fluoro-19-norandrostane-17β-ol-3-one 17β-propionate.

Similarly, by substituting other lower alkanoic anhydrides such as acetic and caproic anhydrides for propionic anhydride in the above procedure, the corresponding 17-lower alkanoates are obtained, i.e. the 17-acetate and 17-caproate respectively of 9α-bromo-11β-fluoro-19-norandrostane-17β-ol-3-one.

EXAMPLE 18

*6α,11β-Difluoro-9α-Chloro-19-Norandrostane-17β-ol-3-one*

A. *6α - fluoro - 19-nor-4,9(11)-androstadiene-17β-ol-3-one.*—To a solution of 200 g. of sucrose in 1.5 l. of tap water contained in a 2 liter Fernbach flask is added 500 mg. of 6α-fluoro-19-nor-4,9(11)-androstadiene-17β-ol-3-one. The resulting suspension is autoclaved at 15 lbs. pressure and at 120° C. for 45 minutes. To the cooled solution is then added 100 ml. of ethanol and 100 g. of Fleischmann bakers yeast. The pH of the reaction mixture is adjusted to 4.5–5.0 by the addition of dilute sulfuric acid, the yeast cell mass is dispersed, and mechanical agitation, sufficiently slow to maintain anaerobic conditions, is commenced.

This agitation is continued for 48 hours, and during the first 12 hours the pH of the medium is adjusted hourly of 4.5–5.0 by addition of dilute ammonium hydroxide. Subsequently pH determinations and adjustments are made every 8 hours. At the end of the reaction period the mixture is centrifuged for one hour, and the supernatant liquid is separated. The remaining cell mass is extracted by refluxing for ½ hour with two 1-liter portions of methanol. The combined methanolic extracts and supernatant liquid are concentrated in vacuo to about 200 ml. and water (400 ml.) is added. The resulting aqueous solution is now extracted three times with methylene chloride, and the combined methylene chloride extracts are dried with magnesium sulfate and evaporated in vacuo. The resulting crude residue is then extracted three times with boiling diethyl ether, and the combined ethereal extracts are passed through a column of Florisil. The eluates are evaporated and the residue is crystallized from acetone-hexane to give 6α-fluoro-19-nor-4,9(11)-androstadiene-17β-ol-3-one.

B. *6α - fluoro-19-nor-9(11)-androstene-17β-ol-3-one.*—Two grams of 6α-fluoro-19-nor-4,9(11)-androstadiene-17β-ol-3-one (the compound of Example 18A) is dissolved in 80 ml. of tetrahydrofuran and reduced with a solution of 600 mg. of lithium in 400 ml. of ammonia according to the procedure of Example 4A. The resultant product is isolated and purified in the described manner to give 6α-fluoro-19-nor-9(11)-androstene-17β-ol-3-one.

C. *6α,11β - difluoro - 9α - chloro-19-norandrostane-17β-ol-3-one.*—One gram of 6α-fluoro-19-nor-9(11)-androstene-17β-ol-3-one (prepared as in Example 18B) is allowed to react with 503 mg. of N-chlorosuccinimide and 0.68 g. of hydrogen fluoride in the manner of Example 2C. The resultant product is isolated and purified in the described manner to give 6α,11β-difluoro-9α-chloro-19-norandrostane-17β-ol-3-one.

EXAMPLE 19

*6α,11β-Difluoro-9α-Chloro-19-Norandrostane-17β-ol-3-one 17β-Propionate*

A. *6α - fluoro - 19 - nor-9(11)-androstene-17β-ol-3-one 17β-propionate.*—6α-fluoro-19-nor-9(11)-androstene-17β-ol-3-one (the compound of Example 18B) is allowed to react with propionic anhydride and pyridine and the resultant product isolated and purified in the manner of Example 5A to give 6α-fluoro-19-nor-9(11)-androstene-17β-ol-3-one 17β-propionate.

B. *6α,11β - difluoro-9α-chloro-19-norandrostane-17β-ol-3-one 17β-propionate.*—One gram of 6α-fluoro-19-nor-9(11)-androstene-17β-ol-3-one 17β-propionate (the compound of Example 19A) is allowed to react with 440 mg. of N-chlorosuccinimide and 0.58 g. of hydrogen fluoride according to the procedure of Example 2C. The resultant product is isolated and purified in the described manner to give 6α,11β-difluoro-9α-chloro-19-nor-androstane-17β-ol-3-one 17β-propionate.

Alternatively, 6α,11β-difluoro-9α-chloro-19-norandrostane-17β-ol-3-one (the compound of Example 18) is reacted with propionic anhydride and pyridine in the manner described in Example 5A to give 6α,11β-difluoro-9α-chloro-19-norandrostane-17β-ol-3-one 17β- propionate.

Similarly, by substituting other lower alkanoic acid anhydrides such as acetic anhydride and β-cyclopentylpropionic anhydride for propionic anhydride in the above procedure, the corresponding 17-lower alkanoates are obtained, i.e. the 17-acetate and 17(β-cyclopentylpropionate) respectively of 6α,11β-difluoro-9α-chloro-19-nor-androstene-17β-ol-3-one.

EXAMPLE 20

6α-Methyl-9α,11β-Dichloro-19-Norandrostane-17β-ol-3-one

A. *6α-methyl-19-nor-4,9(11)-androstadiene-17β-ol-3-one.*—6α-methyl-19-nor-4,9(11)-androstadiene - 3,17 - dione (the compound of Example 15D) is reduced with yeast according to the procedure of Example 18A and the resultant product isolated and purified in the described manner to give 6α-methyl-19-nor-4,9(11)-androstadiene-17β-ol-3-one.

B. *6α - methyl-19-nor-9(11)-androstene-17β-ol-3-one.*—Two grams of 6α-methyl-19-nor-4,9(11)-androstadiene-17β-ol-3-one (the compound of Example 20A) dissolved in 80 ml. of tetrahydrofuran is reduced with a solution of 600 mg. of lithium in 400 ml. of liquid ammonia in the manner of Example 2B. The resultant product is isolated and purified in the described manner to give 6α-methyl-19-nor-9(11)-androstene-17β-ol-3-one.

C. *6α-methyl-9α,11β-dichloro-19-norandrostane-17β-ol-3-one.*—In the manner described in Example 1, one gram of 6α-methyl-19-nor-9(11)-androstene-17β-ol-3-one (the compound of Example 20B) is allowed to react with 585 mg. of chlorine in carbon tetrachloride and pyridine and the resultant product isolated and purified to give 6α-methyl-9α,11β-dichloro-19-norandrostane-17β-ol-3-one.

EXAMPLE 21

6α-Methyl-9α,11β-Dichloro-19-Norandrostane-17β-ol-3-one 17β-Acetate

A. *6α-methyl-19-nor-9(11)androstene-17β-ol-3-one 17β-acetate.*—In a manner similar to that described in Example 5A, 6α-methyl-19-nor-9(11)-androstene-17β-ol-3-one (the compound of Example 20B) is allowed to react with acetic anhydride and pyridine and the resultant product isolated and purified to give 6α-methyl-19-nor-9(11)-androstene-17β-ol-3-one 17β-acetate.

By substituting other lower alkanoates such as propionic and valeric for acetic in the above procedure, the corresponding 17-lower alkanoates are obtained, i.e. the 17-propionate and 17-valerate respectively of 6α-methyl-19-nor-9(11)-androstene-17β-ol-3-one.

B. *6α-methyl - 9α,11β - dichloro-19-norandrostane-17β-ol-3-one 17β-acetate.*—In the manner described in Example 9B, 1 g. of 6α-methyl-19-nor-9(11)-androstene-17β-ol-3-one 17β-acetate (the compound of Example 21A) is allowed to react with 455 mg. of N-chlorosuccinimide and the resultant product isolated and purified to give 6α-methyl-9α,11β-dichloro-19-norandrostane-17β-ol - 3 - one 17β-acetate.

In a similar fashion, the 17-propionate and 17-valerate of 6α-methyl-19-nor-9(11)-androstene-17β-ol-3-one (prepared as described in Example 21A) may be chlorinated in the above manner to give respectively 6α-methyl-9α,11β-dichloro-19-norandrostane-17β-ol-3-one 17β - propionate and 6α-methyl-9α,11β-dichloro-19-norandrostane-17β-ol-3-one 17β-valerate.

EXAMPLE 22

9α,11β-Dichloro,17α-Methylandrostane-17β-ol-3-one

In the manner described in Example 1, one gram of 17α-methyl-9(11)-androstene-17β-ol-3-one is allowed to react with 259 mg. of chlorine in carbon tetrachloride and pyridine and the resultant product isolated and purified to give 9α,11β-dichloro-17α-methylandrostane-17β-ol-3-one.

EXAMPLE 23

9α,11β-Dichloro-17α-Methylandrostane-17β-ol-3-one 17β-Propionate

A. *17α-methyl-9(11)-androstene-17β-ol-3-one 17β-propionate.*—A solution of 1 g. of 17α-methyl-9(11)-androstene-17β-ol-3-one in 10 ml. of propionic anhydride is refluxed under an atmosphere of nitrogen until esterification is substantially complete as determined by paper chromatography using dinitrophenylhydrazine as the indicating reagent. The reaction mixture is cooled, poured into water and the aqueous mixture stirred for about 3 hours and then extracted with ether. The ethereal extracts are combined, washed with 5% aqueous sodium bicarbonate solution and with water. The washed solution is dried over magnesium sulfate, filtered and evaporated in vacuo to a residue which is crystallized from acetone-hexane to give 17α-methyl-9(11)-androstene-17β-ol-3-one 17β propionate.

B. *9α,11β - dichloro-17α-methylandrostane-17β-ol-3-one 17β-propionate.*—In the manner described in Example 9B, 1 g. of 17α-methyl-9(11)-androstene-17β-ol-3-one 17β-propionate (the compound of Example 23A is allowed to react with 408 mg. of N-chlorosuccinimide and 112 mg. of hydrogen chloride and the resultant product isolated and purified to give 9α,11β-dichloro-17α-methylandrostane-17β-ol-3-one 17β-propionate.

EXAMPLE 24

6α,11β-Difluoro-9α-Chloro-17α-Methylandrostane-17β-ol-3-one

A. *6α-fluoro - 17α - methyl-9(11)-androstene-17β-ol-3-one.*—In the manner described in Example 4A, 2 g. of 6α-fluoro-17α-methyl-4,9(11)-androstadiene-17β-ol-3-one dissolved in 80 ml. of tetrahydrofuran is reduced with a solution of 600 mg. of lithium in 400 ml. of liquid ammonia and the resultant product isolated and purified to give 6α-fluoro-17α-methyl-9(11)-androstene-17β-ol-3-one.

B. *6α,11β-difluoro - 9α - chloro-17α-methylandrostane-17β-ol-3-one.*—In a manner similar to that described in Example 9B, 1 g. of 6α-fluoro-17α-methyl-9(11)-androstene-17β-ol-3-one (the compound of Example 24A) is allowed to react with 459 mg. of N-chlorosuccinimide and 625 mg. of hydrogen fluoride and the resultant product isolated and purified to give 6α,11β-difluoro-9α-chloro-17α-methylandrostane-17β-ol-3-one.

EXAMPLE 25

6α,11β-Difluoro-9α-Chloro-17α-Methylandrostane-17β-ol-3-one 17β-Propionate

A. *6α-fluoro-17α-methyl-9(11)-androstene-17β - ol - 3-one 17β-propionate.*—In the manner described in Example 23A, 6α-fluoro-17α-methyl-9(11)-androstene-17β-ol-3-one (the compound of Example 24A) is reacted with propionic anhydride and the resultant product isolated and purified to give 6α-fluoro-17α-methyl-9(11)-androstene-17β-ol-3-one 17β-propionate.

B. *6α,11β-difluoro-9α - chloro-17α - methylandrostane-17β-ol-3-one 17β-propionate.*—In the manner described in Example 2C, 1 g. of 6α-fluoro-17α-methyl-9(11)-androstane-17β-ol-3-one 17β-propionate (the compound of Example 25A) is allowed to react with 393 mg. of N-chlorosuccinimide and 530 mg. of hydrogen fluoride and the resultant product isolated and purified to give 6α,11β - difluoro - 9α - chloro - 17α - methylandrostane-17β-ol-3-one 17β-propionate.

EXAMPLE 26

6α,17α-Dimethyl-9α,11β-Dichloroandrostane-17β-ol-3-one

A. *6α,17α-dimethyl-9(11)-androstene - 17β-ol-3-one.*—In the manner described in Example 4A, 2 g. of 6α,17α-dimethyl-4,9(11)-androstadiene-17β-ol-3-one dissolved in 70 ml. of tetrahydrofuran is reduced with a solution of 600 mg. of lithium in 400 ml. of liquid ammonia and the resultant product isolated and purified to give 6α,17α-dimethyl-9(11)-androstene-17β-ol-3-one.

B. *6α,17α-dimethyl-9α,11β-dichloroandrostane - 17β-ol-3-one.*—In the manner described in Example 9B, 6α,17α-dimethyl-9(11)-androstene-17β-ol-3-one (the compound of Example 26A) is allowed to react with 466 mg. of N-chlorosuccinimide and 127 mg. of hydrogen chloride and the resultant product isolated an purified in the described manner to give 6α,17α-dimethyl-9α,11β-dichloroandrostane-17β-ol-3-one.

EXAMPLE 27

*6α,17α-Dimethyl-9α,11β-Dichloroandrostane-17β-ol-3-one 17β-Propionate*

A. *6α,17α - dimethyl-9(11)-androstene - 17β-ol-3-one 17β - propionate.* — 6α,17α-dimethyl-9(11)-androstene-17β-ol-3-one (the compound of Example 26A) is esterified with propionic anhydride according to the procedure described in Example 23A to give 6α,17α-dimethyl-9(11)-androstene-17β-ol-3-one 17β-propionate.

B. *6α,17α-dimethyl - 9α,11β-dichloroandrostane-17β-ol-3-one 17β-propionate.* — One gram of 6α,17α-dimethyl-9(11)-androstene-17β-ol-3-one 17β-propionate (prepared as in Example 27A) is allowed to react with 211 mg. of chlorine in carbon tetrachloride and pyridine in the manner of Example 1. The resultant product is isolated and purified in the described manner to give 6α,17α-dimethyl-9α,11β-dichloroandrostane-17β-ol-3-one 17β-propionate.

Alternatively, 6α, 17α - dimethyl-9α,11β-dichloroandrostane-17β-ol-3-one (the compound of Example 26B) is reacted with propionic anhydride according to the procedure of Example 23A to give 6α, 17α-dimethyl-9α,11β-dichloroandrostane-17β-ol-3-one 17β-propionate.

Similarly, by substituting other lower alkanoic anhydrides such as acetic and valeric for propionic in the above procedure, the corresponding 17-lower alkanoate esters are obtained, i.e. the 17-acetate and 17-valerate of 6α,17α-dimethyl-9α,11β-dichloroandrostane-17β-ol-3-one.

EXAMPLE 28

*6α,17α-Dimethyl-9α-Iodo-11β-Fluoroandrostane-17β-ol-3-one 17β-Propionate*

One gram of 6α,17α-dimethyl-9(11)-androstene-17β-ol-3-one 17β-propionate (the compound of Example 27A) is allowed to react with 715 mg. of N-iodosuccinimide and 102 mg. of hydrogen fluoride in the manner described in Example 11. The resultant product is isolated and purified in the described manner to give 6α,17α-dimethyl-9α-iodo-11β-fluoroandrostane-17β-ol-3-one 17β-propionate.

EXAMPLE 29

*9α,11β-Dichloro-17α-Methyl-19-Norandrostane-17β-ol-3-one*

A. *17α-methyl-19-nor-4-androstene - 11α,17β-diol - 3-one 11α-p-toluenesulfonate.*—To a solution of 1 g. of 17α-methyl-19-nor-4-androstene-11α,17β-diol-3-one in 5 ml. of pyridine is added 1 g. of p-toluenesulfonyl chloride. The reaction mixture is allowed to stand at room temperature for 17 hours and is then poured into 100 ml. of water. A solid separates which is filtered, washed with water and dried to give 17α-methyl-19-nor-4-androstene-11α,17β-diol-3-one 11α-p-toluenesulfonate which is used without further purification in the following procedure.

B. *17α-methyl-19-nor-4,9(11)-androstadiene - 17β-ol-3-one.*—One gram of the p-toluenesulfonate ester (prepared in Example 29A) and 200 mg. of sodium formate are dissolved in 15 ml. of ethanol and 0.6 ml. of water. The resultant solution is refluxed for 17 hours, cooled, poured into 100 ml. of water and filtered. The residue is washed with water, dried and crystallized from acetone-hexane to yield 17α-methyl-18-nor-4,9(11)-androstadiene-17β-ol-3-one.

C. *17α - methyl-19-nor-9(11)-androstene - 17β-ol - 3-one.*—A solution of 2 g. of 17α-methyl-19-nor-4,9(11)-androstadiene-17β-ol-3-one (the compound of Example 29B) in 80 ml. of tetrahydrofuran is reduced with a solution of 600 mg. of lithium in 400 ml. of liquid ammonia in the manner of Example 2B. The resultant product is isolated and purified in the described manner to give 17α-methyl-19-nor-9(11)-androstene-17β-ol-3-one.

D. *9α,11β-dichloro-17α-methyl-19-norandrostane - 17β-ol-3-one.*—In the manner described in Example 1, one gram of 17α-methyl-19-nor-9(11)-androstene-17β-ol-3-one is allowed to react with 260 mg. of chlorine in carbon tetrachloride and pyridine and the resultant product isolated and purified to give 9α,11β-dichloro-17α-methyl-19-norandrostane-17β-ol-3-one.

EXAMPLE 30

*9α,11β-Dichloro-17α-Methyl-19-Norandrostane-17β-ol-3-one 17β-Propionate*

A. *17α-methyl-19-nor-9(11)-androstene - 17β-ol-3-one 17β-Propionate.* — 17α-methyl-19-nor-9(11)-androstene-17β-ol-3-one (the compound of Example 29B) is esterified with propionic anhydride in the manner of Example 23A to give 17α-methyl-19-nor-9(11)-androstene-17β-ol-3-one 17β-propionate.

B. *9α,11β-dichloro-17α-methyl-19-norandrostane-17β-ol-3-one 17β propionate.*—In the manner described in Example 1, one gram of 17α-methyl-19-nor-9(11)-androstene-17β-ol-one 17β-propionate is allowed to react with 228 mg. of chlorine in carbon tetrachloride and pyridine and the resultant product isolated and purified to give 9α,11β-dichloro-17α-methyl-19-norandrostane-17β - ol - 3-one 17β-propionate.

Alternatively, 9α,11β-dichloro-17α-methyl-19-norandrostane-17β-ol-3-one (the compound of Example 29) is esterified with propionic anhydride in the manner described in Example 23A to give 9α,11β-dichloro-17α-methyl-19-norandrostane-17β-ol-3-one 17β-propionate.

EXAMPLE 31

*6α-Fluoro-9α,11β-Dichloro-17α-Methyl-19-Norandrostane-17β-ol-3-one*

A. *6α - fluoro - 17α-methyl-19-nor-9(11)-androstene-17β - ol-3-one.*—Two grams of 6α-fluoro-17α-methyl-19-nor-4,9(11)-androstadiene - 17β-ol-3-one dissolved in 80 ml. of tetrahydrofuran is reduced with a solution of 600 mg. of lithium in 400 ml. of liquid ammonia in the manner of Example 2B. The resultant product is isolated and purified in the described manner to give 6α-fluoro-17α-methyl-19-nor-9(11)-androstene-17β-ol-3-one.

B. *6α - fluoro - 9α,11β - dichloro - 17α - methyl - 19-norandrostane-17β-ol-3-one.*—According to the procedure of Example 1, one gram of 6α-fluoro-17α-methyl-19-nor-9(11)-androstene-17β-ol-3-one is allowed to react with 255 mg. of chlorine in carbon tetrachloride and pyridine, and the resultant product isolated and purified to give 6α-fluoro - 9α,11β - dichloro - 17α - methyl-19-norandrostane-17β-ol-3-one.

EXAMPLE 32

*6α-Fluoro-9α,11β-Dichloro-17α-Methyl-19-Norandrostane-17β-ol-3-one 17β-Propionate*

A. *6α-fluoro-17α-methyl-19 - nor - 9(11) - androstene-17β-ol-3-one 17β-propionate.* — 6α-fluoro-17α-methyl-19-nor-9(11)-androstene-17β-ol-3-one (the compound of Example 31A) is esterified with propionic anhydride and the resultant product isolated and purified in the manner described in Example 23A to give 6α-fluoro-17α-methyl-19-nor-9(11)-androstene-17β-ol-3-one 17β-propionate.

B. *6α-fluoro-9α,11β-dichloro-17α - methyl - 19 - norandrostane-17β-ol-3-one 17β-propionate.*—One gram of 6α-fluoro-17α-methyl-19-nor-9(11)-androstene-17β-ol-3 - one 17β-propionate is allowed to react with 405 mg. of N-chlorosuccinimide and 110 mg. of hydrogen chloride in the manner of Example 9B, and the resultant product isolated and purified to give 6α-fluoro-9α,11β-dichloro-17α-methyl-19-norandrostane-17β-ol-3 - one 17β - propionate.

Alternatively, 6α - fluoro - 9α,11β-dichloro-17α-methyl-19-norandrostane-17β-ol-3-one is esterified with propionic anhydride in the manner of Example 23A to give 6α-fluoro-9α,11β-dichloro-17α - methyl - 19 - norandrostane-17β-ol-3-one 17β-propionate.

EXAMPLE 33

*6α,17α-Dimethyl-9α,11β-Dichloro-19-Norandrostane-17β-ol-3-one*

A. *6α-methyl-19-nor-3,5,9(11) - androstatriene - 3,17-dione 3,17-dione 3-pyrrolidylenamine.*—To a refluxing solution of 5 g. of 6α-methyl-19-nor-4,9(11)-androstadiene-3,17-dione in 20 ml. of methanol under an atmosphere of nitrogen there is added 2 ml. of pyrrolidine. The solution is refluxed for 5 minutes, cooled, filtered and the residue dried to give 6α-methyl-19-nor-3,5,9(11)-androstatriene-3,17-dione 3-pyrrolidylenamine which is used without further purification in the following procedure.

B. *6α,17α-dimethyl-19 - nor - 4,9(11) - androstadiene-17β-ol-3-one.*—To 16 ml. of a stirred solution of 4 molar methyl magnesium bromide in ether under an atmosphere of nitrogen, there is added dropwise a solution of 5 g. of the pyrrolidylenamine prepared in Example 33A in 80 ml. of tetrahydrofuran. The reaction mixture is distilled until the vapor temperature reaches 60° C. and then is refluxed for 18 hours. After cooling the reaction mixture in an ice bath, 40 ml. of water is added, followed by 25 ml. of acetic acid and 80 ml. of methanol. The mixture is warmed to dissolve the steroidal material and to the solution there is added 60 ml. of 10% aqueous sodium hydroxide. The alkaline mixture is then refluxed for 30 minutes, cooled, neutralized with acetic acid and concentrated in vacuo to a residue having a volume of about 10 ml. The methylene chloride solution is washed with 10% hydrochloric acid, then water and evaporated in vacuo. The resultant residue is dissolved in a minimum amount of methylene chloride and chromatographed on Florisil. The fractions eluted with 50–60% ether-in-hexane are combined and concentrated to give 6α,17α-dimethyl-19-nor-4,9(11)-androstadiene-17β-ol - 3-one.

C. *6α,17α-dimethyl-19-nor-9(11)-androstene - 17β - ol-3-one.*—Two grams of 6α,17α-dimethyl-19-nor-4,9(11)-androstadiene-17β-ol-3-one (the compound of Example 33B) is dissolved in 80 ml. of tetrahydrofuran and is reduced with a solution of 600 mg. of lithium in 400 ml. of liquid ammonia in the manner described in Example 2B to give 6α,17α-dimethyl-19-nor-9(11)-androstene-17β-ol-3-one.

D. *6α,17α-dimethyl-9α,11β-dichloro-19-norandrostane-17β-ol-3-one.* — One gram of 6α,17α-dimethyl-19-nor-9(11)-androstene-17β-ol-3-one (the compound of Example 33C) is allowed to react with 260 mg. of chlorine and the resultant product isolated and purified in the manner described in Example 1 to give 6α,17α-dimethyl-9α,11β-dichloro-19-norandrostane-17β-ol-3-one.

EXAMPLE 34

*6α,17α-Dimethyl-9α,11β-Dichloro-19-Norandrostane-17β-ol-3-one 17β-Propionate*

A. *6α,17α-dimethyl-19-nor-9(11)-androstene-17β-ol-3-one 17β-propionate.*—In the manner described in Example 23A 6α,17α-dimethyl-19-nor-9(11)-androstene-17β-ol-3-one (the compound of Example 33C) is esterified with propionic anhydride and the resultant product isolated and purified to give 6α,17α-dimethyl-19-nor-9(11)-androstene-17β-ol-3-one 17β-propionate.

B. *6α,17α-dimethyl-9α,11β - dichloro - 19 - norandrostane-17β-ol-3-one 17β-propionate.*—In the manner described in Example 9B 1 g. of 6α,17α-dimethyl-19-nor-9(11)-androstene-17β-ol-3-one 17β-propionate is allowed to react with 488 mg. of N-chlorosuccinimide and 134 mg. of hydrogen chloride and the resultant product isolated and purified to give 6α,17α-dimethyl-9α,11β-dichloro-19-norandrostane-17β-ol-3-one 17β-propionate.

Alternatively, 6α,17α-dimethyl-9α,11β-dichloro-19-norandrostane-17β-ol-3-one is esterified with propionic anhydride in the manner of Example 23A to give 6α,17α-dimethyl-9α,11β-dichloro-19-norandrostane-17β-ol-3 - one 17β-propionate.

EXAMPLE 35

*9α-Bromo-11β-Fluoroandrostane-3,17-Dione*

In the manner described in Example 3B, 1 g. of 9(11)-androstene-3,17-dione in 50 ml. of diethylacetic acid is allowed to react with 133 mg. of hydrogen fluoride in 5 ml. of a chloroform-tetrahydrofuran solution (1:2) and 528 mg. of N-bromoacetamide and the resultant product isolated and purified to give 9α-bromo-11β-fluoroandrostane-3,17-dione.

In a similar manner, 6α,-fluoro-9(11)-androstene-3,17-dione (the compound of Example 2B) is reacted with hydrogen fluoride and N-bromoacetamide in the above-described manner to give 6α,11β-difluoro-9α-bromoandrostane-3,17-dione.

EXAMPLE 36

*6α,11β-Difluoro-9α-Bromoandrostane-17β-ol-3-one 17β-Propionate*

In the manner described in Example 3B, 1 g. of 6α-fluoro-9(11)-androstene-17β-ol-3-one 17β-propionate (the compound of Example 8A) is reacted with 105 mg. of hydrogen fluoride in 4.8 ml. of chloroformtetrahydrofuran solution (1:2) and 416 mg. of N-bromoacetamide, and the resultant product isolated and purified to give 6α,11β-difluoro-9α-bromoandrostane-17β-ol - 3 - one 17β-propionate.

Similarly, 9(11)-androstene-17β-ol - 3 - one - 17β - propionate (the compound of Example 5A) and 6α-methyl-9(11)-androstene-17β-ol-3-one 17β-propionate (the compound of Example 10A) are reacted with hydrogen fluoride and N-bromoacetamide in the above-described manner to yield respectively 9α-bromo-11β-fluoroandrostane - 17β - ol - 3-one 17β-propionate and 6α-methyl-9α-bromo-11β-fluoroandrostane-17β-ol-3-one 17β-propionate.

EXAMPLE 37

*6α,17α-Dimethyl-9α-Bromo-11β-Fluoroandrostane-17β-ol-3-one*

According to the procedure of Example 3B, 1 g. of 6α,17α-dimethyl-9(11)-androstene-17β-ol-3-one (the compound of Example 26A) is allowed to react with 120 mg. of hydrogen fluoride in 5 ml. of chloroform-tetrahydrofuran solution (1:2) and 416 mg. of N-bromoacetamide and the resultant product isolated and purified to give 6α,17α - dimethyl - 9α - bromo-11β-fluoroandrostane-17β-ol-3-one.

Similarly, 17α-methyl - 9(11) - androstene-17β-ol-3-one (the compound of Example 29C) and 6α-fluoro-17α-methyl-9(11)-androstene-17β-ol-3-one (the compound of Example 31A) are reacted with hydrogen fluoride and N-bromoacetamide according to the above-described procedure to give respectively 9α-bromo - 11β - fluoro-17α-methylandrostane-17β-ol-3-one and 6α,11β - difluoro - 9α-bromo-17α-methylandrostane-17β-ol-3-one.

EXAMPLE 38

*6α,17α-Dimethyl-9α-Bromo-11β-Fluorostane-17β-ol-3-one 17β-Propionate*

6α,17α - dimethyl-9α-bromo-11β-fluoroandrostane-17β-ol-3-one (the compound of Example 37) is reacted with propionic anhydride and pyridine in the manner of Example 5A, and the resultant product isolated and purified in the described manner to give 6α,17α-dimethyl-9α-bromo-11β-fluoroandrostane-17β-ol-3-one 17β-propionate.

Similarly, 9α - bromo-11β-fluoro-17α-methylandrostane-17β-ol-3-one and 6α,11β - difluoro-9α-bromo-17α-methylandrostane-17β-ol-3-one (prepared in the manner described in Example 37) are reacted with propionic anhydride and pyridine to yield respectively 9α-bromo-11β-fluoro-17α-methylandrostane-17β-ol-3-one 17β-propionate and 6α,11β-difluoro-9α-bromo-17α-methylandrostane-17β-ol-3-one 17β-propionate.

By substituting other acid anhydrides such as acetic or cyclopentylpropionic for propionic anhydride in the above procedure, the corresponding 17-acetate and 17-(β-cyclopentylpropionate) are obtained, respectively of 6α,17α-dimethyl-9α-bromo - 11β - fluoroandrostane-17β-ol-3-one, 9α - bromo-11β-fluoro - 17α - methylandrostane-17β-ol-3-one and 6α,11β-difluoro-9α-bromo-17α-methylandrostane-17β-ol-3-one.

EXAMPLE 39

*9α-Bromo-11β-Fluoro-17α-Methyl-19-Norandrostane-17β-ol-3-one*

In the manner described in Example 3B, 1 g. of 17α-methyl-19-nor-9(11)-androstene-17β-ol-3-one (the compound of Example 29B) is allowed to react with 132 mg. of hydrogen fluoride in 5.3 ml. of chloroform-tetrahydrofuran mixture (1:2) and the resultant product isolated and purified to give 9α-bromo-11β-fluoro-17α-methyl-19-norandrostane-17β-ol-3-one.

In similar manner, 6α,17α-dimethyl - 19 - nor-9(11)-androstene-17β-ol-3-one (the compound of Example 33C) and 6α - fluoro-17α-methyl-19-nor-9(11)-androstene-17β-ol-3-one (the compound of example 31A) are allowed to react with hydrogen fluoride and N-bromoacetamide according to the above-described procedure to yield respectively 6α,17α-dimethyl-9α-bromo-11β-fluoro-19-norandrostane-17β - ol - 3 - one and 6α,11β-difluoro-9α-bromo-17α-methyl-19-norandrostane-17β-ol-3-one.

EXAMPLE 40

*9α-Bromo-11β-Fluoro-17α-Methyl-19-Norandrostane-17β-ol-3-one 17β-Propionate*

In the manner described in Example 5A, 9α-bromo-11β - fluoro-17α-methyl - 19 - norandrostane-17β-ol-3-one (the compound of Example 39) is reacted with propionic anhydride in pyridine and the resultant product isolated and purified to give 9α-bromo-11β-fluoro-17α-methyl-19-norandrostane-17β-ol-3-one 17β-propionate.

Similarly, 6α,17α-dimethyl - 9α - bromo-11β-fluoro-19-norandrostane - 17β - ol - 3 - one and 6α,11β-difluoro-9α-bromo-17α-methyl - 19 - norandrostane-17β-ol-3-one (prepared as described in Example 39) are esterified by means of propionic anhydride in pyridine to yield respectively 6α,17α - dimethyl-9α-bromo-11β-fluoro-19-norandrostane-17β - ol - 3 - one 17β-propionate and 6α,11β-difluoro-9α-bromo - 17α - methyl-19-norandrostane-17β-ol-3-one 17β-propionate.

EXAMPLE 41

*6α,11β-Difluoro-9α-Bromoandrostane-17β-ol-3-one*

A. *6α-fluoro - 9(11) - androstene-17β-ol-3-one.*—One gram of 6α-fluoro-9(11)-androstene-17β-ol-3-one 17β-propionate (the compound of Example 8A) is dissolved in 19.5 ml. of methanol and there is added 0.5 ml. of 72% aqueous perchloric acid. The reaction solution is left overnight at room temperature, then poured into water. A solid results which is filtered, washed with water, dried and recrystallized from acetone-hexane to give 6α-fluoro-9(11)-androstene-17β-ol-3-one.

B. *6α,11β - difluoro - 9α - bromoandrostane-17β-ol-3-one.*—In the manner described in Example 3B, 6α-fluoro-9(11)-androstene-17β-ol-3-one (prepared as described in Example 41A) is reacted with hydrogen fluoride and N-bromoacetamide, and the resultant product isolated and purified to give 6α,11β-difluoro-9α-bromoandrostane-17β-ol-3-one.

Alternatively, 6α,11β-difluoro-9α-bromoandrostane-17β-ol-3-one 17β-propionate (the compound of Example 36) is reacted with aqueous perchloric acid in methanol according to the procedure of Example 41A to give 6α,11β-difluoro-9α-bromoandrostane-17β-ol-3-one.

In similar manner, the compounds having an esterified 17-hydroxyl group which were prepared in the preceding examples such as 9α-chloro-11β-fluoroandrostane-17β-ol-3-one 17β-propionate (the compound of Example 5) and 6α - methyl - 9α,11β-dichloroandrostane-17β-ol-3-one 17β-propionate (the compound of Example 10) when hydrolyzed according to the procedure of Example 41A are converted to the corresponding 17-hydroxyl compound such as 9α-chloro-11β-fluoroandrostane-17β-ol-3-one and 6α - methyl-9α,11β-dichloroandrostane-17β-ol-3-one, respectively.

EXAMPLE 42

*9α,11β-Difluoroandrostane-3,17-Dione*

A solution of 1 g. of 9(11)-androstene-3,17-dione in a mixture of 20 ml. of tetrahydrofuran and 30 ml. of chloroform containing 630 mg. of finely powdered lead dioxide is chilled in −20° C. There is then added dropwise with vigorous stirring a solution of 680 mg. of hydrogen fluoride in 5 ml. of chloroform-tetrahydrofuran. The mixture is stirred in the cold for 5 hours, then diluted with water and made basic by the addition of sodium carbonate. Stirring is continued for 15 minutes, then the organic layer is separated and evaporated to a residue which is chromatographed on magnesium silicate. The material eluted with 60% ether-in-hexane to 100% ether is combined and crystallized from acetone-hexane to give 9α,11β-difluoroandrostane-3,17-dione.

In similar manner, 6α-fluoro-9(11)-androstene-3,17-dione and 6α-methyl-9(11)-androstene-3,17-dione are reacted with lead dioxide and hydrogen fluoride according to the above procedure and the resultant product isolated and purified in the described manner to give respectively, 6α,9α,11β-trifluoroandrostane,3,17-dione and 6α-methyl-9α,11β-difluoroandrostane-3,17-dione.

EXAMPLE 43

*9α-Fluoro-11β-Chloro-17α-Methylandrostane-17β-ol-3-one*

A. *9α-fluoro - 17α - methylandrostane-11α,17β-diol - 3-one.*—A solution of 5 g. of 9α-fluoro-17α-methyl-4-androstene-17β-ol-3,11-dione in 200 ml. of tetrahydrofuran is added to a stirred solution of 2 g. of lithium in 800 ml. of liquid ammonia. The excess lithium is then destroyed by the addition of solid ammonium chloride and the ammonia is allowed to evaporate at room temperature. Water is added to the resultant residue and the mixture extracted with ether. The ether extracts are combined, washed with water, dried over magnesium sulfate and evaporated in vacuo to a residue which is crystallized from acetone-hexane to give 9α-fluoro-17α-methylandrostane-11α,17β-diol-3-one.

B. *9α-fluoro-17α-methylandrostane - 11α,17β-diol-3-one 11α - methanesulfonate.*—One gram of 9α-fluoro - 17α-methylandrostane-11α,17β-diol-3-one (the compound of Example 43A) is dissolved in 10 ml. of pyridine and 1 ml. of methanesulfonyl chloride is added. The mixture is kept at room temperature for 18 hours, then poured into 100 ml. of water. A solid separates which is filtered, washed with water, dried and crystallized from acetone-hexane to give 9α-fluoro-17α-methylandrostane-11α,17β-diol-3-one 11α-methanesulfonate.

C. *9α-fluoro-11β-chloro-17α - methylandrostane-17β-ol-3-one.*—To 500 mg. of 9α-fluoro-17α-methylandrostane-11α,17β-diol-3-one (the compound of Example 43B) is added 10 ml. of dimethylsulfoxide containing 2 g. of lithium chloride. The reaction mixture is stirred at 60° C. for 18 hours, then poured in water. A solid separates which is filtered, washed with water and dried to give substantially 9α-fluoro-11β-chloro-17α-methylandrostane-17β-ol-3-one.

EXAMPLE 44

*9α-Bromo-11β-Fluoro-17α-Ethyl-19-Norandrostane-17-ol-3-one*

A. *6α - methyl-19-nor-9(11)-androstene-3,17 - dione 3-pyrrolidylenamine.*—To a refluxing solution of 5 g. of 6α-methyl-19-nor-9(11)-androstene-3,17-dione (the compound of Example 15E) in 20 ml. of methanol under an atmosphere of nitrogen there is added 2 ml. of pyrrolidine. The solution is refluxed for 5 minutes, then cooled and filtered. The residue is dried to give 6α-methyl-19-nor - 9(11)-androstene-3,17-dione 3-pyrrolidylenamine, which is used without further purification in the following procedure.

B. *6α-methyl-17α-ethyl-19-nor - 9(11)-androstene-17β-ol-3-one.*—To 60 ml. of a stirred solution of 4 molar ethyl magnesium bromide in ether under an atmosphere of nitrogen there is added dropwise a solution of 5 g. of 6α-methyl-19-nor-9(11)-androstene-3,17-dione-3 -pyrrolodylenamine (the compound of Example 44A) in 80 ml. of tetrahydrofuran. The reaction mixture is distilled until the vapor temperature reaches 60° C. then is refluxed for 18 hours. The reaction mixture is then cooled and 40 ml. of water added followed by 25 ml. of acetic acid and 80 ml. of methanol. The mixture is heated until solution is effected then 60 ml. of 10% aqueous sodium hydroxide is added and refluxed for 30 minutes. After cooling the reaction mixture is neutralized with acetic acid and concentrated in vacuo to a residue having a small volume. The residue is extracted with methylene chloride and the extracts are washed with 10% hydrochloric acid then water, dried over magnesium sulfate and evaporated in vacuo to a residue which is chromatographed on Florisil. The substance eluted with 50–60% ether-in-hexane yields 6α-methyl - 17α-ethyl-19-nor-9(11)-androstene-17β-ol-3-one.

C. *9α - bromo-11β-fluoro - 17α-ethyl-19-norandrostane-17β-ol-3-one.*—According to the procedure of Example 3B, 1 g. of 6α-methyl-17α-ethyl-19-nor-9(11)-androstene-17β-ol-3-one (the compound of Example 44B) is allowed to react with hydrogen fluoride in chloroform-tetrahydrofuran solution (1:2) and N-bromacetamide and the resultant product isolated and purified to give 9α-bromo-11β-fluoro-17α-ethyl-19-norandrostane-17β-ol-3-one.

EXAMPLE 45

*9α-Bromo-11β-Fluoro-19-Norandrostane-3,17-Dione*

According to the procedure of Example 3B, 1 g. of 19-nor-9(11)-androstene-3,17-dione (the compound of Example 13B) in diethylacetic acid is reacted with hydrogen fluoride and N-bromoacetamide and the resultant product isolated and purified to give 9α-bromo-11β-fluoro-19-norandrostane-3,17-dione.

Similarly, 6α-fluoro-19 - nor - 9(11) - androstene - 3,17-dione (the compound of Example 14A) and 6α-methyl-19-nor-9(11)-androstene-3,17-dione (the compound of Example 15E) is allowed to react with hydrogen fluoride and N-bromoacetamide to yield respectively 6α,11β-difluoro - 9α - bromo-19-norandrostane - 3,17-dione and 6α-methyl - 9α-bromo-11β-fluoro - 19-norandrostane - 3,17-dione.

EXAMPLE 46

*9α-Bromo-11β-Chloro-19-Norandrostane-17β-ol-3-one*

In the manner of Example 6, 1 g. of 19-nor-9(11)-androstene-17β-ol-3-one (the compound of Example 16A) in acetic acid is allowed to react with lithium chloride, N-bromoacetamide and hydrogen chloride. The resultant product is isolated and purified in the described manner to give 9α-bromo-11β-chloro-19-norandrostane-17β-ol-3-one.

Similarly, 6α-fluoro-19-nor-9(11)-androstene-17β-ol-3-one (the compound of Example 18B) and 6α-methyl-19-nor-9(11)-androstene-17β-ol-3-one are reacted with lithium chloride, N-bromoacetamide and hydrogen chloride in the manner described above to give respectively 6α-fluoro - 9α-bromo-11β-chloro-19-norandrostane-17β-ol-3-one and 6α-methyl-9α - bromo-11β-chloro-19 - norandrostane-17β-ol-3-one.

EXAMPLE 47

*9α-Bromo-11β-Chloro-19-Norandrostane-17β-ol-3-one 17β-Propionate*

One gram of 19-nor-9(11)-androstene-17β-ol-3-one 17β-propionate (the compound of Example 17A) is allowed to react with N-bromoacetamide, hydrogen chloride and lithium chloride in acetic acid according to the procedure of Example 6. The resultant product is isolated and purified in the described manner to give 9α-bromo - 11β-chloro-19-norandrostane-17β-ol-3-one 17β-propionate.

In a similar manner, 6α-fluoro-19-nor-9(11)-androstene-17β-ol-3-one 17β-propionate (the compound of Example 19A) and 6α-methyl-19-nor-9(11)-androstene-17β-ol-3-one 17β-propionate (the compound of Example 21A) are allowed to react with N-bromoacetamide, hydrogen chloride and lithium chloride according to the above procedure to give respectively 6α-fluoro-9α-bromo-11β-chloro-19-norandrostane-17β-ol-3-one 17β-propionate and 6α-methyl-9α-bromo-11β-chloro-19 - norandrostane-17β-ol-3-one 17β-propionate.

Alternatively, 1 g. of 9α-bromo-11β-chloro-19-norandrostane-17β-ol-3-one (the compound of Example 46) is allowed to react with propionic anhydride in pyridine and the resultant product isolated and purified according to the procedure described in Example 5 to give 9α-bromo-11β-chloro - 19-norandrostane - 17β-ol-3-one 17β-propionate.

EXAMPLE 48

*6α-Fluoro-9α,11β-Dichloro-17α-Methylandrostane-17β-ol-3-one 17β-Propionate*

One gram of 6α-fluoro-17α-methyl-9(11)-androstene-17β-ol-3-one 17β-propionate (the compound of Example 24A) in carbon tetrachloride and in the presence of pyridine is allowed to react with chlorine according to the procedure of Example 1. The resultant product is isolated and purified in the described manner to give 6α-fluoro - 9α,11β - dichloro-17α-methylandrostane-17β-ol-3-one 17β-propionate.

EXAMPLE 49

*9α-Bromo-11β-Chloro-17α-Methylandrostane-17β-ol-3-one 17β-Propionate*

17α-Methyl-9(11)-androstene-17β-ol-3-one (the compound of Example 23A) is allowed to react with N-bromoacetamide, hydrogen chloride and lithium chloride in acetic acid according to the procedure of Example 6. The resultant product is isolated and purified in the described manner to give 9α-bromo-11β-chloro-17α-methylandrostane-17β-ol-3-one 17β-propionate.

In a similar manner, 6α-fluoro-17α-methyl-9(11)-androstene-17β-ol-3-one 17β-propionate (the compound of Example 25A) and 6α,17α-dimethyl-9(11)-androstene-17β-ol-3-one 17β-propionate (the compound of Example 27A) are reacted with N-bromoacetamide, hydrogen chloride and lithium chloride in glacial acetic acid according to the above procedure to yield respectively 6α-fluoro-9α-bromo - 11β - chloro - 17α - methyl-androstane-17β-ol-3-one 17β-propionate and 6α,17α-dimethyl-9α-bromo-11β-chloroandrostane-17β-ol-3-one 17β-propionate.

EXAMPLE 50

*9α-Bromo-11β-Chloro-17α-Methylandrostane-17β-ol-3-one*

17α-Methyl-9(11)-androstene-17β-ol-3-one is allowed to react with N-bromoacetamide, hydrogen chloride and lithium chloride in glacial acetic acid according to the procedure of Example 6. The resultant product is isolated and purified in the described manner to give 9α-bromo-11β-chloro-17α-methylandrostane-17β-ol-3-one.

Similarly, 6α-fluoro-17α-methyl-9(11)-androstene-17β-ol-3-one (the compound of Example 24A) and 6α,17α-dimethyl-9(11)-androstene-17β-ol-3-one (the compound of Example 26A) are reacted with N-bromoacetamide, hydrogen chloride and lithium chloride according to the above described procedure to yield respectively 6α-fluoro-9α-bromo - 11β - chloro-17α-methylandrostane-17β-ol-3-one and 6α,17α-dimethyl-9α-bromo-11β-chloroandrostane-17β-ol-3-one.

Alternatively, 9α-bromo-11β-chloro-17α-methylandrostane-17β-ol-3-one 17β-propionate, 6α-fluoro-9α-bromo-11β - chloro-17α-methylandrostane-17β-ol-3-one 17β-propionate, and 6α,17α-dimethyl-9α-bromo-11β-chloroandrostane-17β-ol-3-one 17β-propionate (prepared as described in Example 49) are hydrolyzed by means of methanolic perchloric acid according to the procedure of Example 41A to give respectively, 9α-bromo - 11β - chloro-17α-methylandrostane-17β-ol-3-one, 6α-fluoro-9α-bromo-11β-chloro-17α-methylandrostane-17β-ol-3-one, and 6α,17α-dimethyl-9α-bromo-11β-chloroandrostane-17β-ol-3-one.

EXAMPLE 51

*9α,11β-Dichloro-16α-Methylandrostane-3,17-Dione*

A. *16α - methyl-4,9(11)-pregnadiene-17α,21-diol-3,20-dione.*—The requisite intermediate, 16α-methyl-4,9(11)-pregnadiene-17α,21-diol-3,20-dione 21-acetate is prepared from 16-pregnene-3α-ol-11,20-dione in the manner described in copending application Serial No. 733,843 of Rausser et al., filed May 8, 1958.

A mixture of 0.5 g. of 16α-methyl-4,9(11)-pregnadiene-17α,21-diol-3,20-dione 21-acetate in 100 ml. of methanol in 20 ml. of chloroform, 5 ml. of water and 5 ml. of concentrated hydrochloric acid is allowed to stand for 48 hours at room temperature. Water is then added and the mixture extracted with methylene chloride. The organic extracts are washed with water, dried and concentrated to a residue which is crystallized from acetone to give 16α-methyl-4,9(11)-pregnadiene-17α,21-diol-3,20-dione.

In similar fashion, 16β-methyl-4,9(11)-pregnadiene-17α,21-diol-3,20-dione 21-acetate (prepared as described in copending application Serial No. 733,843 of Rausser et al., filed May 8, 1958) is hydrolyzed to 16β-methyl-4,9(11)-pregnadiene-17α,21-diol-3,20-dione.

B. *16α-methyl-4,9(11)-androstadiene-3,17-dione.*—One gram of 16α-methyl - 4,9(11) - pregnadiene-17α,21-diol-3,20-dione (the compound of Example 51A) is dissolved in 800 ml. of 50% aqueous acetic acid and there is added 18 g. of sodium bismuthate. The suspension is stirred at room temperature for 20 hours. The reaction mixture is filtered and methylene chloride added to the filtrate. Water is also added to the filtrate and the organic phase is separated, washed first with water, then with 10% aqueous sodium bicarbonate solution and again with water. The methylene chloride solution is then dried over magnesium sulfate, filtered and evaporated in vacuo to a residue which is crystallized from methylene chloride-hexane to give 16α-methyl-4,9(11)-androstadiene-3,17-dione.

In similar manner, 16β-methyl-4,9(11)-pregnadiene-17α,21-diol-3,20-dione is allowed to react with sodium bismuthate in aqueous acetic acid to give 16β-methyl-4,9(11)-androstadiene-3,17-dione.

C. *16α - methyl - 9(11) - androstene-3,17-dione.*—Two grams of 16α-methyl-4,9(11)-androstadiene - 3,17 - dione (the compound of Example 51B) are dissolved in 80 ml. of tetrahydrofuran and reduced with a solution of 600 mg. of lithium in 400 ml. of liquid ammonia in the manner described in Example 2B. The resultant product is isolated and purified in the described manner to give 16α-methyl-9(11)-androstene-3,17-dione.

In similar manner, 16β-methyl-4,9(11)-androstadiene-3,17-dione (prepared as described in Example 51B) is reduced in lithium and liquid ammonia to give 16β-methyl-9(11)-androstene-3,17-dione.

D. *9α,11β - dichloro - 16α - methylandrostane-3,17-dione.*—In the manner described in Example 1, one gram of 16α-methyl-9(11)-androstene-3,17-dione (the compound of Example 51C) is reacted with chlorine in carbon tetrachloride in the presence of pyridine and the resultant product isolated and purified to give 9α,11β-dichloro-16α-methylandrostane-3,17-dione.

EXAMPLE 52

*9α-Bromo-11β-Fluoro-16β-Methylandrostane-3,17-Dione*

One gram of 16β-methyl-9(11)-androstene-3,17-dione (prepared as described in Example 51C) is reacted with hydrogen fluoride and N-bromoacetamide according to the procedure of Example 3B. The resultant product is isolated and purified in the described manner to give 9α-bromo-11β-fluoro-16β-methylandrostane-3,17-dione.

In similar manner, 16α-methyl-9(11)-androstene-3,17-dione (the compound of Example 51C) is reacted with N-bromoacetamide and hydrogen fluoride to give 9α-bromo-11β-fluoro-16α-methylandrostane-3,17-dione.

EXAMPLE 53

*9α-Bromo-11β-Fluoro-16α-Methylandrostane-17β-ol-3-one*

A. *16α-methyl - 9(11) - androstene-17β-ol-3-one.*—500 mg. of 16α-methyl-9(11)-androstene-3,17-dione (the compound of Example 52C) is subjected to the action of bakers' yeast in the manner described in Example 18A. The resultant product is isolated and purified in the described manner to give 16α-methyl-9(11)-androstene-17β-ol-3-one.

In similar fashion, 16β-methyl-9(11)-androstene-3,17-dione is subjected to the action of bakers' yeast to yield 16β-methyl-9(11)-androstene-17β-ol-3-one.

B. *9α-bromo-11β-fluoro-16α - methylandrostane-17β-ol-3-one.*—According to the procedure of Example 3B, 1 g. of 16α-methyl-9(11)-androstene-17β-ol-3-one (the compound of Example 53A) is allowed to react with N-bromoacetamide and hydrogen fluoride and the resultant product isolated and purified to give 9α-bromo-11β-fluoro-16α-methylandrostane-17β-ol-3-one.

In similar fashion, 16β-methyl-9(11)-androstene-17β-ol-3-one is reacted with N-bromoacetamide and hydrogen fluoride to give 9α-bromo-11β-fluoro-16β-methylandrostane-17β-ol-3-one.

EXAMPLE 54

*9α,11β-Dichloro-16β-Methylandrostane-17β-ol-3-one*

16β - methyl-9(11)-androstene-17β-ol-3-one (prepared as described in Example 53A) is reacted with chlorine in carbon tetrachloride and in the presence of pyridine in the manner described in Example 1 to give 9α,11β-dichloro-16β-methylandrostane-17β-ol-3-one.

EXAMPLE 55

*9α-Bromo-11β-Chloro-17α-Ethylandrostane-17β-ol-3-one*

A. *9(11)-androstene-3,17-dione 3-pyrrolidylenamine.*—In the manner described in Example 44A, 9(11)-androstene-3,17-dione is reacted with pyrrolidine in methanol to give 9(11)-androstene-3,17-dione 3-pyrrolidylenamine.

B. *17α-ethyl-9(11)-androstene-17β-ol-3-one.* — 9(11)-androstene-3,17-dione 3-pyrrolidylenamine (the compound of Example 55A) is reacted with ethyl magnesium bromide in ether according to the procedure of Example 44B. The resultant product is isolated and purified in the described manner to give 17α-ethyl-9(11)-androstene-17β-ol-3-one.

C. *9α-bromo-11β-chloro-17α-ethylandrostane-17β-ol-3-one.* — 17α - ethyl - 9(11)-androstene-17β-ol-3-one (the compound of Example 55B) is allowed to react with lithium chloride, N-bromacetamide and hydrogen chloride in acetic acid according to the procedure of Example 6. The resultant product is isolated and purified in the described manner to give 9α-bromo-11β-chloro-17α-ethylandrostane-17β-ol-3-one.

We claim:
1. A compound selected from the group consisting of 9α,11β-dihalogeno-androstanes and the 19-nor analogs thereof, said 9α,11β-dihalogenoandrostanes having the following formula:

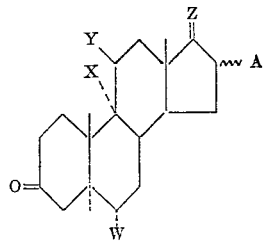

wherein A is a member of the group consisting of hydrogen and lower alkyl; W is a member of the group consisting of hydrogen, methyl and fluorine; X and Y are halogen; and Z is a member of the group consisting of O,

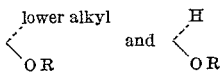

wherein R is a member of the group consisting of hydrogen and an acyloxy radical of a hydrocarbon carboxylic acid containing up to eight carbon atoms.

2. 9α-X-11β-Y-17α - methylandrostane - 17β - ol-3-one wherein X and Y are halogen.
3. 6α-fluoro-9α-X-11β - 17α - methylandrostane - 17β-ol-3-one wherein X and Y are halogen.
4. 6α,17α-dimethyl-9α-X-11β-Y-androstane - 17β - ol-3-one wherein X and Y are hologen.
5. 9α-X-11β-Y-androstane-17β-ol-one wherein X and Y are halogen.
6. 6α-fluoro - 9α - X - 11β-Y-androstane-17β-ol-3-one wherein X and Y are halogen.
7. 6α-methyl - 9α - X - 11β-Y-androstane-17β-ol-3-one wherein X and Y are halogen.
8. 9α-X-11β-Y-androstane-17β-ol-3-one 17β-lower alkanoate wherein X and Y are halogen.
9. 6α-fluoro-9α-X-11β-Y-androstane-17β-ol-3-one 17β-lower alkanoate wherein X and Y are halogen.
10. 6α-methyl-9α-X-11β-Y-androstane - 17β - ol-3-one 17β-lower alkanoate wherein X and Y are halogen.
11. 9α,11β-dichloroandrostane-17β-ol-3-one.
12. 6α,11β-difluoro-9α-bromoandrostane-17β-ol-3-one.
13. 6α-methyl-9α - bromo - 11β - floroandrostane-17β-ol-3-one.
14. 9α-bromo-11β-chloroandrostane-17β-ol-3-one 17β-propionate.
15. 6α,11β-difluoro-9α-bromoandrostane - 17β - ol - 3-one 17β-propionate.
16. 6α-methyl-9α-bromo-11β - fluoroandrostane - 17β-ol-3-one 17β-propionate.
17. 9α,11β-dichloro-17α-methylandrostane-17β - ol - 3-one.
18. 6α,11β-difluoro-9α-bromo-17α - methylandrostane-17β-ol-3-one.
19. 6α,17α-dimethyl-9α-bromo-11β - fluoroandrostane-17β-ol-3-one.
20. 9α-bromo-11β-fluoro-16-methylandrostane - 17β-3-one.

No references cited.